Figure 1:
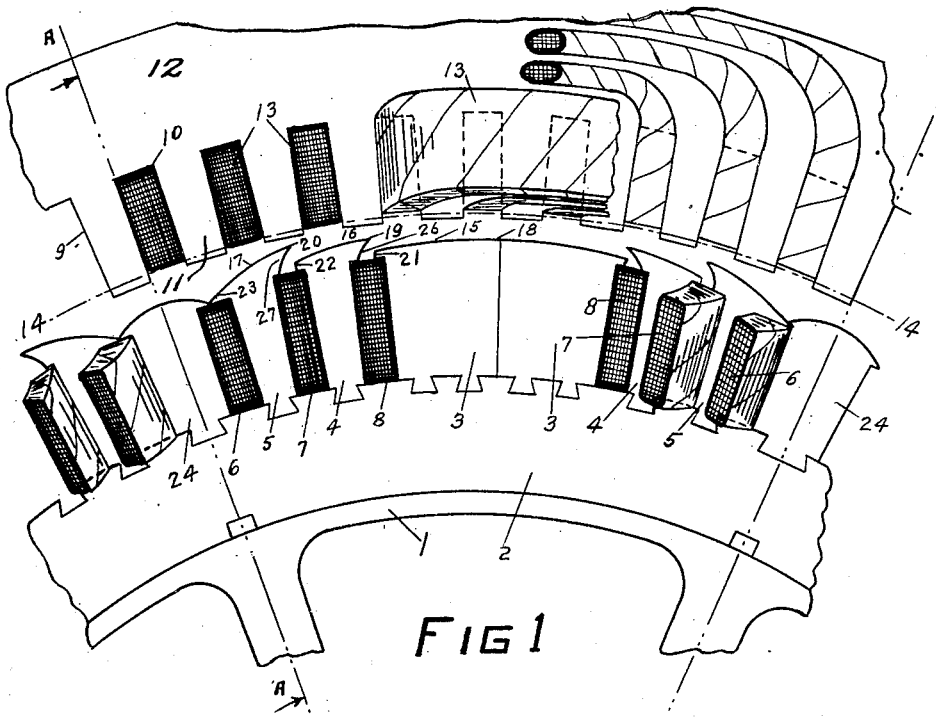

Nov. 18, 1930. J. F. H. DOUGLAS ET AL 1,782,200

SYNCHRONOUS DYNAMO ELECTRIC MACHINE

Filed April 27, 1925

Inventors.
John F. H. Douglas
Edward W. Kane
By Quarles & French
Attorneys

Patented Nov. 18, 1930

1,782,200

UNITED STATES PATENT OFFICE

JOHN F. H. DOUGLAS AND EDWARD W. KANE, OF MILWAUKEE, WISCONSIN

SYNCHRONOUS DYNAMO-ELECTRIC MACHINE

Application filed April 27, 1925. Serial No. 26,113.

Our invention relates to dynamo electric machines of the synchronous type, and more particularly to field magnet structures in which the winding is distributed. In machines of this type previously made, the pole face has either been made concentric with the armature surface or with the several members diverging from the armature surface toward the outer part of each portion of the poles. The latter of these two forms is much superior to the first in its wave form of induced electromotive force, in that sudden and rapid changes in the magnetic flux density opposite the openings over the exciting coils is largely avoided. However, the wave of induced voltage of the latter form is by no means a sine wave and shows marked defects which cause undesirable noise in telephone circuits adjacent to lines to which such machines are connected. The deviation of the voltage from a sine wave may be traced to a deviation of the flux density on the armature surface from a sinusoidal distribution in such a manner that considerable components or harmonics of noise-producing qualities, or high frequency as compared to the useful current, are present.

In order to improve the magnetic flux distribution, we shape the pole faces as follows: The contour of the pole face is shaped so that under each member of the pole the gap is varied approximately inversely as the sine wave or other desirable wave or flux distribution. Thus the gap under each member farthest from the pole center is to the gap nearest the pole center inversely as the flux densities desired opposite these points, and not as the magneto-motive forces of the coils. The result is that the inclination of the central member is somewhat less than known forms and the divergence of the outermost members somewhat more. Moreover, we shape the outer members with a greater curvature than the center members so that at intermediate points the desired flux distribution will be had. We find that these departures from usual practice decidedly improve the flux distribution and the wave of induced electromotive force, and hence the efficiency of machines of this type.

We make the gaps on either side of the coil openings unequal, but in the ratio of the available magneto-motive forces on the two faces. However, instead of making the gap at the inner corner on an outer pole member equal to the gap at the center of the pole, we make them in direct ratio as the magneto-motive forces at these two places, and in inverse ratio as the sine wave or other desirable wave of flux distribution.

The coil spacers or retainers on the neutral axis are made of non-magnetic material to avoid their effect of diverting magnetic lines from the armature. The pole tips of opposite polarity most nearly approaching each other are extended until they (the pole tips) are approximately as close to the neutral axis as they (the pole tips) are to the equivalent armature surface. The pole face of the outer member adjacent to the pole tips is corrected also for the curvature of the lines of magnetic force in this region.

For best results the corners or tips of each of the outer pole members nearest the center of the poles are made as sharp as possible and with an acute angle so that their sides adjacent to the slot opening are inclined away from the armature and away from the center of the pole.

Figure 2:
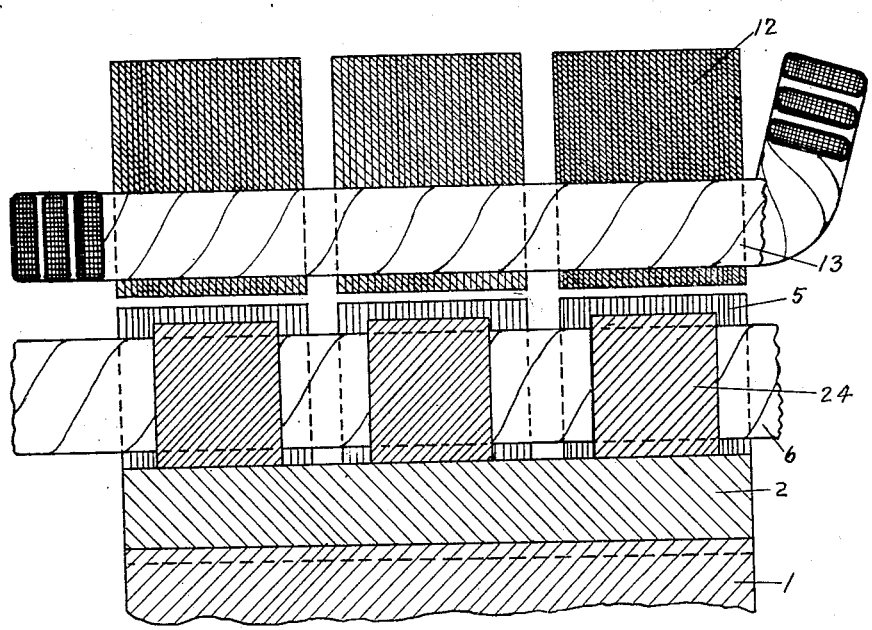

Having described our invention in general terms, we give for the fuller understanding of our invention the following description in connection with the drawings, in which Fig. 1 is a detail elevation of a machine embodying our invention, parts being shown in section; and Fig. 2 is a section upon the line A—A of Fig. 1.

The proper selection of the number of armature slots and coil pitch is important in the design of any alternating current machine. By the proper choice of these factors of design any one or two residual harmonics may be greatly reduced, the ratio of the harmonics left in the voltage to that in the flux being termed belt and pitch differential factors, respectively. Our invention is directed particularly to reduce the harmonics in the flux wave and hence in the voltage wave. The armature winding does not introduce any new harmonics at no load and the same per cent reduction given by the belt and pitch factors of any given design are obtained with our invention.

At full load the armature reaction introduces harmonics in the voltage wave not present originally. These are controlled in any case by proper choice of armature winding and by the ratio of armature to field ampere turns, by methods well known to this art. Our invention discloses no improvement in this effect but we rely chiefly on the elimination of harmonics by shaping the field iron, which in itself has an equal effect at no load and full load.

The spider is 1 and is mounted on a shaft (not shown) in any well-known manner, and supports the pole yoke or core 2. Each pole is divided into pole members 3, 4 and 5, and is secured to the pole yoke in any suitable manner. The central member 3 is magnetically a unit and may be divided, if desired, for the purpose of better support. The outer members 4 and 5 occur in pairs and may be termed "side members". The exciting winding is divided into coils 6, 7 and 8, shown in section and in elevation. The inner coil 8 surrounds the center member 3 only; the coil 7 surrounds both members 3 and 4; while the outermost coil 6 surrounds the entire pole. The central part of the pole 3 is thus surrounded by all the coils; the side members 4 are surrounded by all the coils except 8; and the outermost members of the core 5 are surrounded by only one coil 6. Thus, if the coils are of equal magnetic strength, the magneto-motive force on the face of member 4 is twice that on member 5, and the magneto-motive force on member 3 is three times that on the face of member 5.

The armature surface 9 is shown divided into slots 10 and teeth 11, the teeth being part of the armature core 12 which is made of laminated iron or steel. The slots between the teeth serve for supporting the armature coils 13 which are disposed in any customary or suitable manner. The armature core is supported by a frame or yoke in any suitable manner. The actual armature surface is broken into the teeth and slots but for the purpose of design it is customary to make computations from a surface which is assumed to have the same magnetic characteristics as the toothed surface but which is a smooth core surface. Such a surface is here indicated by the line 14—14. The equivalent smooth armature surface 14 is located back of the tips of the armature teeth, the ratio of its distance from the pole face to the distance of the tips of the armature teeth to the pole face being the air-gap coefficient, a term well known to designers of electrical machines. The distance of this smooth core surface from the actual tips of the teeth is found by the product of the actual air-gap and the air-gap coefficient. This term "air-gap coefficient" is also known as "extension coefficient for effective air-gap in toothed armatures", and under these names is referred to by C. C. Hawkins in his book "The Dynamo", Pittmann's 1922, page 492, and also in the index list of symbols, page XVIII.

While this extension co-efficient or air-gap coefficient as computed by the charts in the authority cited varies to some extent, the distance from the equivalent armature surface 14—14 to the tips of the teeth 11 is substantially constant. The surface 19—19 may, therefore, be assumed as a circular cylinder having as its axis the center of the shaft. It is from this equivalent armature surface that magnetic clearances or gaps should be reckoned. The faces of the pole members 3, 4 and 5 are 15, 16 and 17; the corners or tips of these faces nearest the pole center 18 are 19 and 20; and the corners or tips farthest from the pole center being 21, 22 and 23, respectively. By the gap or magnetic clearance is meant the distance from any point on the pole face measured in a radial direction to the equivalent armature surface. Thus, the gap at 18 is the distance from face 15 to equivalent armature surface 14 at the point 18.

The gap at 22 is made twice the gap at 20 and the gap at 21 is made 3/2 of the gap at 19. However, the gaps at 18, 19 and 20 are not necessarily equal. On the contrary, with the best spacing of the coils 6, 7 and 8 these gaps will be unequal. We make the gap at 19 and 18 in direct ratio as the magneto-motive forces on faces 16 and 15, and inverse ratio as the magneto-motive flux distribution desired at these points. Similarly, the gap at 20 is to the gap at 18 directly as the magneto-motive force on 17 is to that on 15, and inversely as the desired magnetic density desired at 20 is to that desired at 18.

The inclination of surface 17 is made greater than that of 16, which is in turn greater than that of 15, but with the best spacing of coils 6, 7 and 8 the inclination of 15 is less than known forms and that of face 17 is greater than known forms. We shape them by the rule that the gap at the corner 21 of member 3 is to the gap at 18 inversely as the flux density desired at 21 is to that desired at 18. Similarly, the gap at 22 is to the gap at 19 as the inverse ratio of the densities at the two points, and in a similar manner are the gaps 23 and 20 proportioned. By this means not only a smooth wave is obtained, but also one that varies as the sine wave or other desirable wave of flux distribution.

The face 17 of the outer members of the poles 5 are given greater curvature than the face 16 of member 4, and that in turn is given greater curvature than the face 15 of member 3, in such a manner that the gap under each of these faces varies inversely as a sine wave or other desired wave of flux distribution.

Member 24, which serves to space coils 6 and to retain them in place, is made of non-magnetic material, when used, but may be omitted, if desired, providing members 5 have the requisite strength to hold the coils in place without the aid of members 24. The neutral plane taken along the line A—A is shown by its trace; it is a magnetically neutral plane located halfway between opposite poles. The pole face 17 of the outer members 5 adjacent to the pole tips 23 is prolonged until the pole tips are approximately as close to the neutral axis A—A as they are distant from the armature surface 14. The face 17 of members 5 may not be laid out exactly by the simple rule that the gap is made to vary inversely as the desired flux density, but a slight correction is desirable when the desired flux density along the armature surface 14 varies less rapidly than the distance from the neutral axis, as is the case with a sine wave, the pole face 17 adjacent to the tip 23 is brought slightly closer to the armature surface, and vice versa.

Since the sine wave of flux density is recognized as the best, the best shape of pole face is that in which the distance from the armature surface varies according to the following equation: Let the distance from the neutral axis to any point on the equivalent armature surface be X, and the distance from that point to the pole face be Y, on which the magneto-motive force is $F_K$. If the gap at the pole center is G and the magneto-motive force on that be $F_1$ then the gap at the point X is $$Y = G\left(\frac{F_K}{F_1}\right) \operatorname{cosecant}\left(180\frac{X}{T}\right)°$$

where T is the distance from neutral axis to neutral axis on the equivalent armature surface or the pole pitch, the pole face being corrected for curvature in the lines of force near the pole tips. It will be understood that the above equation holds for the pole face up to the tips; that is, as long as Y is less than the distance to the interpolar axis.

For the best results the corners or tips 19 and 20 of pole members 4 and 5 are made with as sharp a curvature as is possible, and formed to an acute angle so that the under surfaces 26 and 27, adjacent to the slot, are inclined at an angle away from the corners and away from the center of the pole, the best angle being not materially greater than 45 degrees.

For the best results also the slot opening between the poles 3 and 4 and 4 and 5 should be narrow so that the inner tip of an outer pole member is nearer to the center of the pole than the outer tip of the pole member inside and next adjacent to it, but good results are obtained when the inner tip is not farther from the pole center than the outer tip of the next adjacent inner pole member by more than half of the smallest clearance between the pole and the armature at that point.

We show a machine with twelve poles and with a field winding divided into three coils per pole, dividing the pole core into five portions; but it is evident that it is not limited to any number of poles or any number of coils per pole. The modifications needed in any case are clearly set forth in the specification as to their guiding principle. We aim in the appended claims to cover all modifications which do not depart from the spirit and scope of our invention.

The armature winding shown in the drawing is that customarily used, namely, one in which the armature winding is disposed in several slots per pole per phase, but any desirable armature winding may be used in connection with our invention.

By the term "desired wave of flux distribution" we mean a sine wave, or one which does not deviate therefrom at any point more than 10%, nor deviate therefrom in such a manner as to cause objectionable telephone interference.

What we claim as our invention is:

1. The combination with the armature of a dynamo electric machine, of a field magnet having a distributed winding comprising a plurality of coils for each pole, and pole members, each member of the pole so shaped with reference to its adjoining member that air-gaps on the two sides of any coil separating adjacent pole members are to each other as the magneto-motive forces on the respective faces of said pole members.

2. The combination with the armature of a dynamo electric machine, of a field magnet having a distributed winding comprising a plurality of coils for each pole, and poles, each pole comprising a plurality of members including outer pole members, the corners of each outer pole member nearest the pole center being formed to a relatively sharp and acute angle that is, an angle not materially greater than 45°.

3. The combination with the armature of a dynamo electric machine, of a field magnet having a distributed winding comprising a plurality of coils for each pole, and poles, each pole comprising a plurality of members, including outer pole members, the gap at the inner tip of each outer pole member being less than the gap at the central part of the central pole member.

4. The combination with the armature of a dynamo electric machine, of a field magnet having a distributed winding comprising a plurality of coils for each pole, and poles, each pole comprising a plurality of members including outer pole members, the tips of said outer pole members nearest the pole center being distant from the equivalent armature surface, when compared with the gap at the center of the pole, in the direct ratio of the magneto-motive forces on these tips to the magneto-motive force on the center of the poles and in inverse ratio of the values of the desired wave of flux distribution at these points.

5. The combination with the armature of a dynamo electric machine, of a field magnet having a distributed winding comprising a plurality of coils for each pole, and poles, each pole comprising a plurality of members including outer pole members, the gap at the inner tip of each outer pole member being less than the gap at the center part of the central pole member, and the outer pole tip of each outermost pole member approaching the neutral axis at a distance not greater than its distance from the equivalent armature surface.

6. The combination with the armature of a dynamo electric machine, of a field magnet having a distributed winding comprising a plurality of coils for each pole, and poles, each pole comprising a plurality of members including outer pole members, the inner tips of said outer pole members being formed with a relatively sharp acute angle (not materially greater than 45°) and the distance of each tip from the equivalent armature surface being less than the distance from the central part of the central pole member, and the outer pole tip of each outermost pole member approaching the neutral axis at a distance not more than its distance from the equivalent armature surface.

7. The combination with the armature of a dynamo electric machine, of a field magnet having a distributed winding comprising a plurality of coils for each pole, and poles, each pole comprising a plurality of spaced pole members, said pole members arranged to project over the coils so that the inner tip of each of the outer pole members is substantially as close to the center of the pole as the outer pole tip of the adjacent inner pole member.

8. The combination with the armature of a dynamo electric machine, of a field magnet having a distributed winding comprising a plurality of coils for each pole, and poles comprising a plurality of pole members including outer pole members, the curvatures of the faces of the pole members differing so that the curvature of the face of an outer pole member is greater than that of an adjacent inner pole member.

9. The combination with the armature of a dynamo electric machine, of a field magnet having a distributed winding comprising a plurality of coils for each pole, and poles comprising a plurality of pole members including outer pole members, the curvatures of the faces of the pole members differing so that the curvature of the face of an outer pole member is greater than that of an adjacent inner pole member, and the curvatures being such that the air gap between said faces and the equivalent armature surface varies substantially inversely as the desired wave of flux distribution.

In testimony whereof, we affix our signatures.

JOHN F. H. DOUGLAS.
EDWARD W. KANE.